(12) United States Patent
Colber, Jr. et al.

(10) Patent No.: US 8,499,848 B2
(45) Date of Patent: Aug. 6, 2013

(54) GAS TILLER

(75) Inventors: William E. Colber, Jr., Lavonia, GA (US); James Ferrell, Elberton, GA (US); Benjamin Montgomery, Anderson, SC (US)

(73) Assignee: Techtronic Outdoor Products Technology Limited, Hamilton (BM)

( * ) Notice: Subject to any disclaimer, the term of this patent is extended or adjusted under 35 U.S.C. 154(b) by 52 days.

(21) Appl. No.: 13/198,975

(22) Filed: Aug. 5, 2011

(65) Prior Publication Data
US 2013/0032364 A1 Feb. 7, 2013

(51) Int. Cl.
*A01B 33/00* (2006.01)
(52) U.S. Cl.
USPC .................... 172/42; 172/43; 172/123
(58) Field of Classification Search
USPC ............ 172/42, 43, 195–200, 63, 123
See application file for complete search history.

(56) References Cited

U.S. PATENT DOCUMENTS

| | | | |
|---|---|---|---|
| 1,661,237 A | 3/1928 | Shaw | |
| 1,751,694 A | 3/1930 | Glasier | |
| 2,151,117 A | 3/1939 | Kepler | |
| 2,803,183 A | 8/1957 | Smithburn | |
| 2,847,813 A | 8/1958 | Hanson, Jr. et al. | |
| 2,903,077 A | 9/1959 | Kamlukin | |
| 3,016,957 A | 1/1962 | Olson | |
| 3,040,590 A * | 6/1962 | Smithburn | 74/16 |
| 3,074,491 A | 1/1963 | Field | |
| 3,111,996 A | 11/1963 | Ertsgaard | |
| 3,180,428 A | 4/1965 | Price | |
| 3,282,353 A | 11/1966 | Troyer et al. | |
| 3,348,619 A | 10/1967 | Reynolds et al. | |
| 3,792,734 A | 2/1974 | Ellis et al. | |
| D249,518 S | 9/1978 | Cognata et al. | |
| 4,164,983 A | 8/1979 | Hoch | |
| 4,165,786 A | 8/1979 | Dobberpuhl | |
| 4,191,259 A | 3/1980 | Boren | |
| 4,224,996 A | 9/1980 | Dobberpuhl | |
| 4,450,915 A | 5/1984 | DeHaai | |
| 4,640,366 A | 2/1987 | Saito | |

(Continued)

FOREIGN PATENT DOCUMENTS

| | | |
|---|---|---|
| EP | 2033507 | 3/2009 |
| EP | 2263434 | 12/2010 |
| JP | 63-98004 | 6/1988 |
| JP | 6-72303 | 10/1994 |

OTHER PUBLICATIONS

Search Report from the European Patent Office for Application No. 12175809.8 dated Nov. 15, 2012 (6 pages).

*Primary Examiner* — Alicia Torres
(74) *Attorney, Agent, or Firm* — Michael Best & Friedrich LLP

(57) ABSTRACT

A gas tiller including a frame defining a first pivot axis and a second pivot axis spaced a distance from the first pivot axis, a motor coupled to the frame, a set of rotary tines coupled to the frame and operatively coupled to the motor, a swing arm pivotably coupled to the frame and rotatable about the first pivot axis between a first and second arm positions corresponding to travel and tilling configurations, respectively, of the tiller, the swing arm including one or more wheels coupled thereto, and a drag stake pivotably coupled to the frame and rotatable about the second pivot axis between first and second stake positions. Movement of the swing arm between the arm positions moves the drag stake between the stake positions.

22 Claims, 5 Drawing Sheets

U.S. PATENT DOCUMENTS

| | | | |
|---|---|---|---|
| 4,699,219 | A | 10/1987 | Durrant et al. |
| 5,156,217 | A | 10/1992 | Hirata et al. |
| 5,197,551 | A | 3/1993 | Farley |
| 5,265,681 | A | 11/1993 | Kincses |
| 5,511,624 | A | 4/1996 | Dunn |
| 6,151,811 | A | 11/2000 | Barreto |
| 6,540,031 | B1 | 4/2003 | Sasaoka |
| 6,644,416 | B2 | 11/2003 | Teeple |
| 6,722,445 | B2 | 4/2004 | Ohta et al. |
| 6,854,526 | B2 | 2/2005 | Yamazaki et al. |
| 6,860,334 | B2 | 3/2005 | Yamazaki et al. |
| 6,945,333 | B1 | 9/2005 | Drost et al. |
| D540,827 | S | 4/2007 | Notaras et al. |
| 7,237,620 | B2 | 7/2007 | Abenroth et al. |
| 7,866,409 | B2 | 1/2011 | Vaughn et al. |
| 7,963,344 | B2 * | 6/2011 | Marcil et al. .................... 172/43 |
| 2010/0051299 | A1 * | 3/2010 | Marcil et al. .................... 172/42 |

* cited by examiner

GAS TILLER

FIELD

The present invention relates to gas tillers and, more particularly, to a gas tiller with transportation and tilling configurations.

SUMMARY

Rotary tillers can be difficult to transport to and from a work site because the guide wheels and tines are set up to engage the soil at depth during normal operation. As such, in order to make sure that the tines do not inadvertently engage the ground during transportation, the user generally has to hold the handles of the tiller in an awkward position (e.g., very close to the ground or very high in the air) to lift the tines.

In one independent embodiment, a gas tiller may generally include a frame, the frame defining a first pivot axis and a second pivot axis spaced a distance from the first pivot axis. The gas tiller also includes a motor coupled to the frame, a set of rotary tines coupled to the frame and operatively coupled to the motor, a swing arm pivotably coupled to the frame and rotatable about the first pivot axis between a transport position and a tilling position, the swing arm including one or more wheels coupled thereto, and a drag stake pivotably coupled to the frame and rotatable about the second pivot axis between a transport position and a tilling position. Where movement of the swing arm between the transport position and the tilling position moves the drag stake between a transport position and a tiling position.

In another independent embodiment, a gas tiller may generally include a frame, a motor coupled to the frame, a set of rotary tines coupled to the frame and driven by the motor, a swing arm pivotable with respect to the frame over a first angle between a transport position and a tilling position, the swing arm having one or more wheels coupled thereto, and a drag stake pivotably coupled to the frame and rotatable over a second angle between a transport position and a tilling position. Where the first angle is different from the second angle, and where pivoting the swing arm between the transport position and the tilling position pivots the drag stake between the transport position and the tilling position.

In yet another independent embodiment, a gas tiller may generally include a frame, a motor coupled to the frame, a set of rotary tines coupled to the frame and driven by the motor, a swing arm pivotably coupled to the frame and moveable between a transport position and a tilling position, the swing arm having one or more wheels coupled thereto and defining a slot, and a drag stake pivotably coupled to the frame and disposed within the slot such that rotation of the swing arm between the transport position and the tilling position rotates the drag stake between a transport position and a tilling position.

In a further independent embodiment, a gas tiller may generally include a frame, a motor coupled to the frame, a set of rotary tines coupled to the frame and driven by the motor, a swing arm pivotably coupled to the frame and moveable between a transport position and a tilling position, the swing arm having one or more wheels coupled thereto, and a drag stake defining a plurality of pivot axes along its length, the drag stake being pivotably coupled to the frame at one of the plurality of pivot axes whereby it may be pivoted between a transport position and a tilling position. Where moving the swing arm between the transport position and the tilling position pivots the drag stake between the transport position and the tilling position.

Figure 1A:
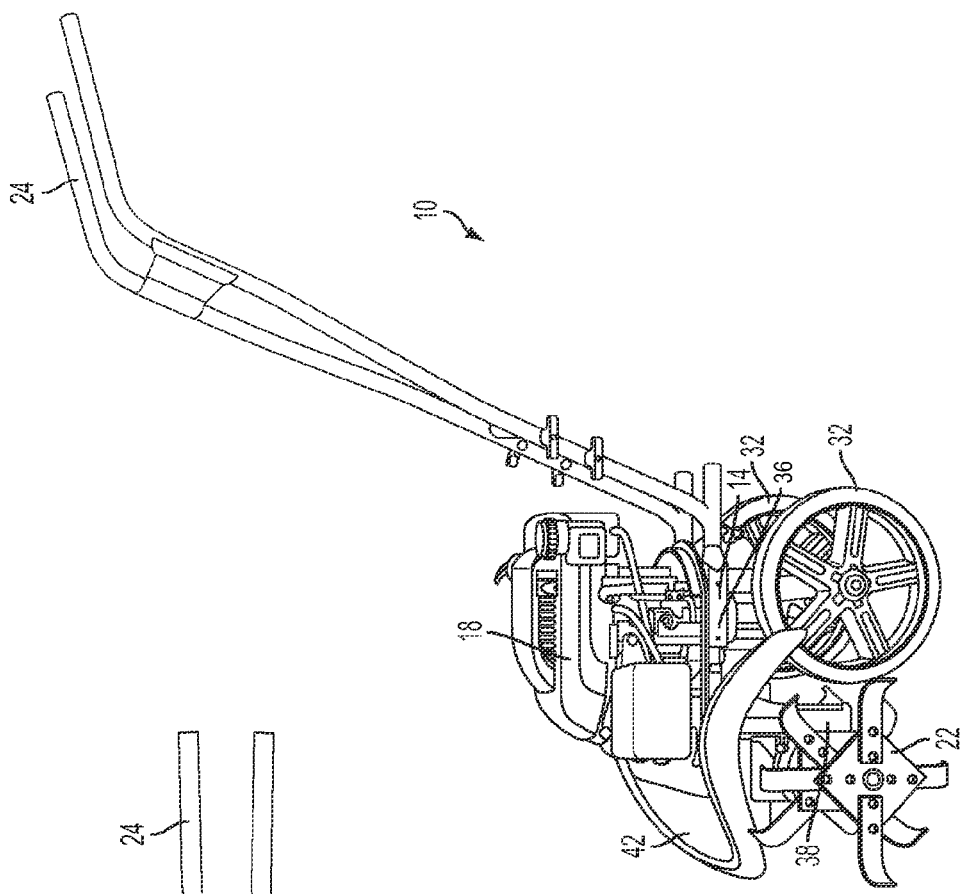
FIG. 1A is a side view of a rotary tiller in a travel configuration.

Before any independent embodiments of the invention are explained in detail, it is to be understood that the invention is not limited in its application to the details of construction and the arrangement of components set forth in the following description or illustrated in the following drawings. The invention is capable of other independent embodiments and of being practiced or of being carried out in various ways. Also, it is to be understood that the phraseology and terminology used herein is for the purpose of description and should not be regarded as limiting.

DETAILED DESCRIPTION

FIGS. 1-5 illustrate a rotary tiller 10 used in gardening, farming, etc., to till or otherwise work the soil. In the illustrated construction, the tiller 10 includes a frame 14, a motor 18 coupled to the frame 14, and a set of tines or blades 22 rotatably mounted on the frame 14 and driven by the motor 18. In the illustrated construction, a swing arm 30 is pivotally connected to the frame 14, and wheels 32 support the tiller 10 for movement over ground during transport of the tiller 10. A drag stake 34 is engageable with the ground during tilling, and, during tilling operations, the motor 18 rotates the tines 22 causing the soil to be pulverized and cultivated, for example, in anticipation of planting crops, flowers, etc.

In the illustrated construction, the tiller 10 is adjustable between a travel configuration (see FIG. 1A), in which the wheels 32 are in supporting engagement with the ground and the tines 22 are spaced a distance from the soil (when the handles 24 are held at a normal operating height), and a tilling configuration (see FIG. 1B), in which the wheels 32 are not in supporting engagement with the ground and the tines 22 are positioned to engage the soil (again, when the handles 24 are held at a normal operating height). Also, in the travel configuration, the drag stake 34 is positioned out of engagement with the ground, and, in the tilling configuration, the drag stake 34 engages the ground. The two modes allow the user to easily transport the tiller 10 between work sites without sacrificing performance while tilling.

As shown in FIGS. 2-5, the illustrated frame 14 includes a substantially pan shaped body 36 providing a mounting location for the motor 18. The body 36 also includes a protrusion 38 extending downwardly proximate the front end 42 to provide a mounting location for the tines 22. In the illustrated construction, the protrusion 38 is hollow, and a driveshaft and/or gear set extends therethrough to transmit torque between the motor 18 and the tines 22. The protrusion 38 may also be sealed to contain oil or other lubricants.

In other constructions (not shown), the frame 14 may include another mounting location for the motor 18 (e.g., on the vertically-extending arm members). Also, in still other constructions, the motor 18 may transmit torque to the tines 22 by any one of a chain drive, a belt system, etc. (not shown).

The body 36 also includes a first mounting location 46 opposite the protrusion 38 and defining a recess (not shown). The recess defines a first axis 54 and is sized to receive at least a portion of an axle 58. The body 36 also includes a second mounting location 62 opposite the protrusion 38 outwardly beyond the mounting location 46. The second mounting location 62 includes a pair of plates 66, each of which define an aperture 70 co-axial with a second axis 74. The second axis 74 is generally parallel to and spaced a distance from the first axis 54. In the illustrated construction, the plates 66 are spaced a distance from one another substantially corresponding to the width of the drag stake 34. When assembled, the drag stake 34 is positioned between and pivotably coupled to the two plates 66 by a pin 78.

The swing arm 30 is substantially rectangular in shape, having a first pair of co-axial mounting lugs 82 at one end and a second pair of co-axial mounting lugs 86 at the opposite end. The first pair of mounting lugs 82 are axially aligned with and pivotably coupled to the first mounting location 46 by the axle 58 (see FIGS. 3 and 5). Once assembled, the swing arm 30 may pivot about the first axis 54 through an arm angle $\alpha_1$ between a first arm position, generally corresponding to the travel or transportation configuration (see FIG. 2), and a second arm position, generally corresponding to the tilling configuration (see FIG. 4).

A set of (e.g., two) wheels 32 are rotatably mounted on the second pair of mounting lugs 86 by a second axle (not shown). As such, when the swing arm 30 rotates between the arm positions corresponding to the travel and tilling configurations, the position of the wheels 32 with respect to the frame 14 and the tines 22 changes. More specifically, when the swing arm 30 is in the first arm position (corresponding to the travel configuration (see FIG. 1A)), the wheels 32 are positioned in supporting engagement with the ground (in a forward and lowered position), which positions the tines 22 a distance from the soil or ground when the handles 24 are held in the same standard operating position described above. This allows the user to move the tiller 10 to and from the work site without the tines 22 contacting the ground. In contrast, when the swing arm 30 is in the second arm position (corresponding to the tilling configuration (see FIG. 1B)), the wheels 94 are positioned in a rearward and up position, thus allowing the tines 22 to engage the soil when the handles 24 of the tiller 10 are held in the standard operating position.

Figure 2:
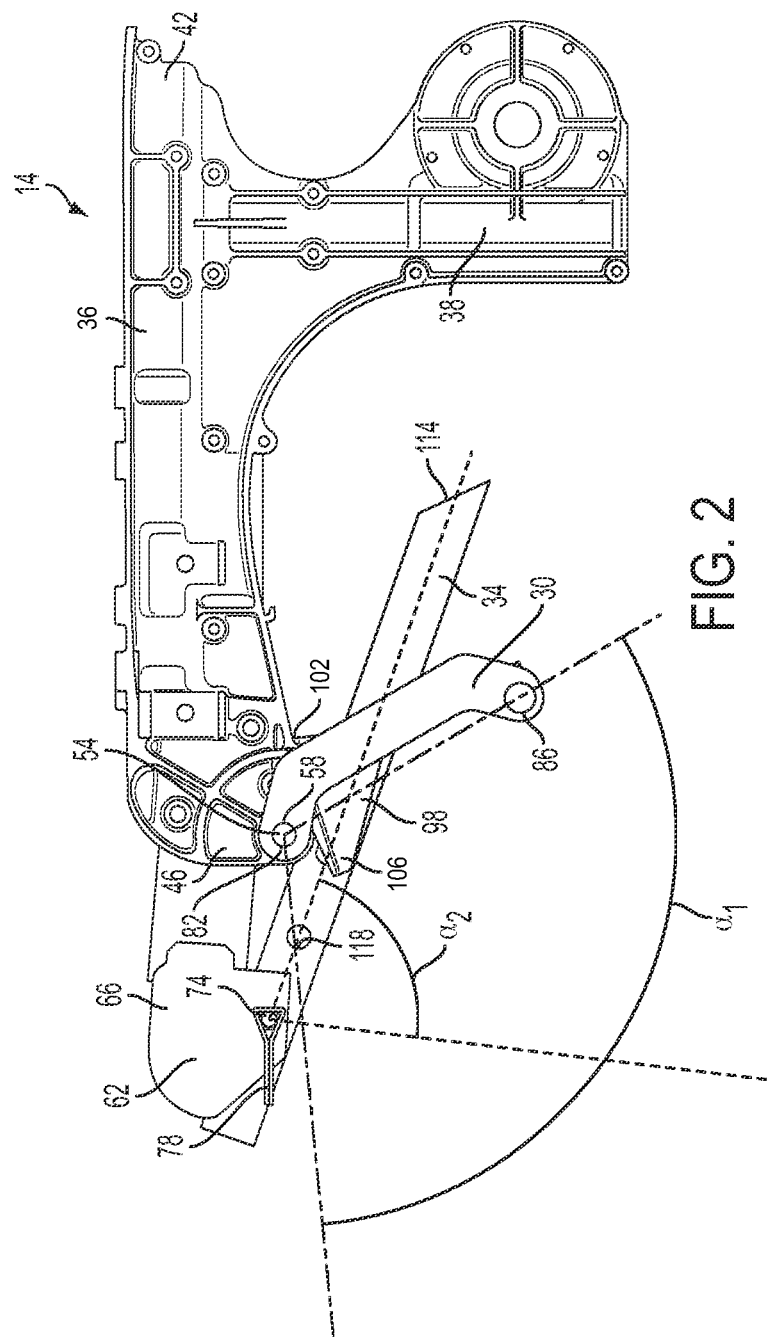
FIG. 2 is a side view of the frame of the tiller in the travel configuration as shown in FIG. 1A.
Figure 3:
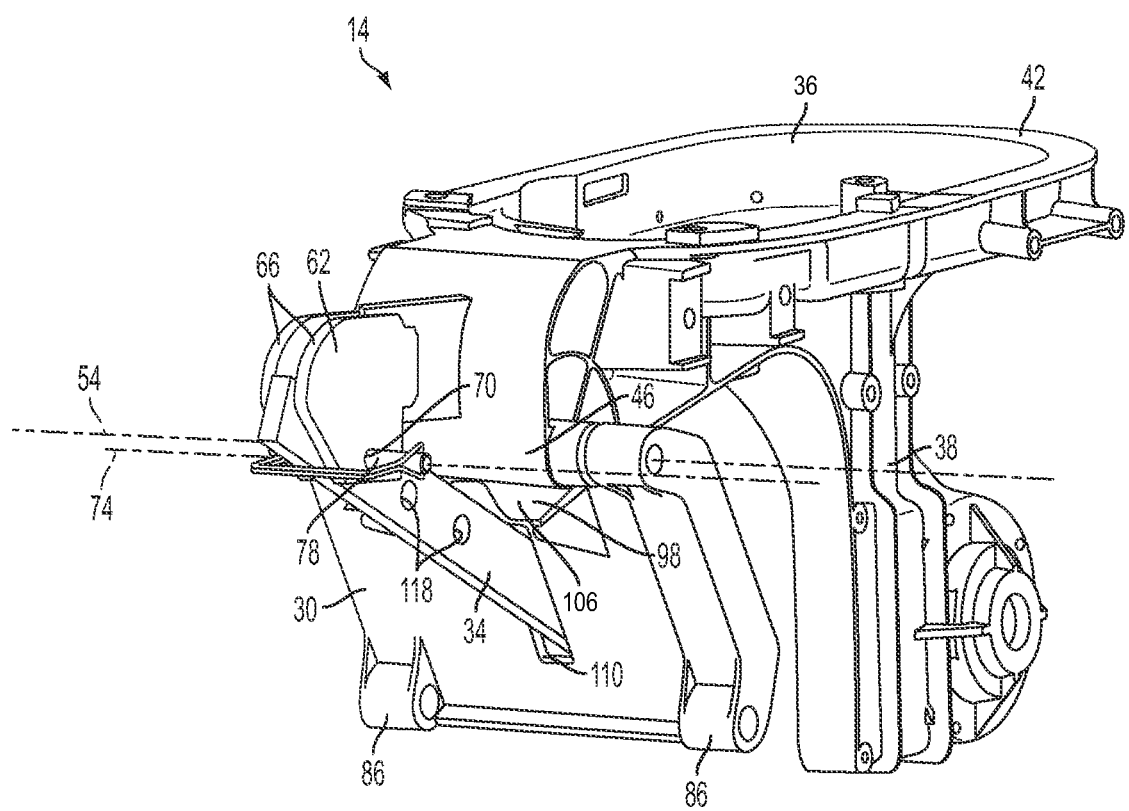
FIG. 3 is a rear perspective view of the frame of the tiller in the travel configuration as shown in FIG. 1A.
Figure 4:
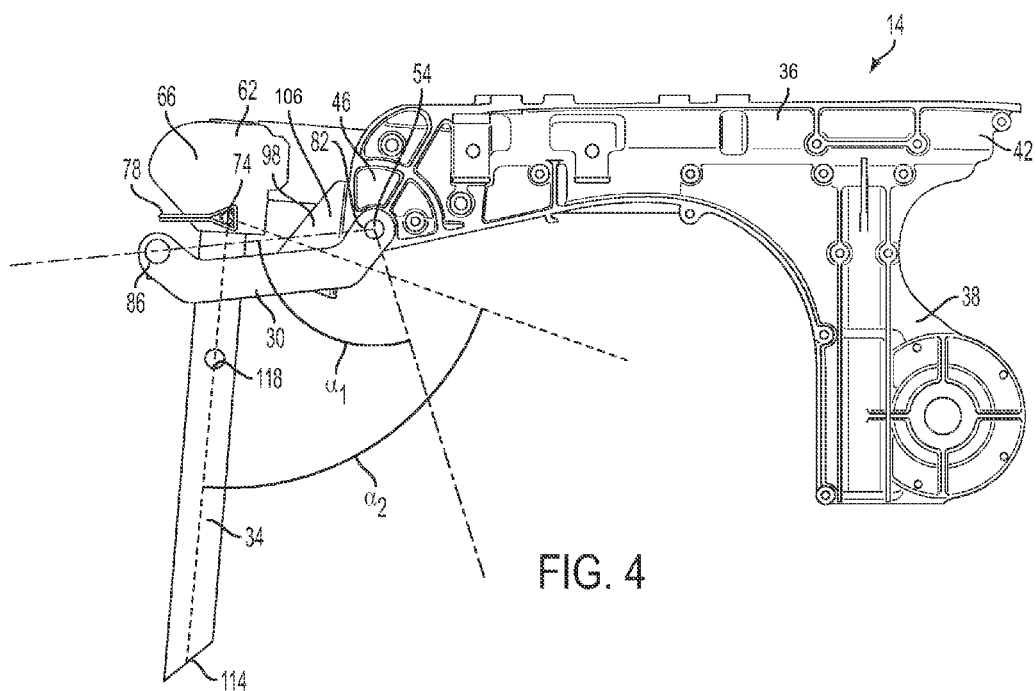
FIG. 4 is a side view of the frame of the tiller in the tilling configuration as shown in FIG. 1B.
Figure 5:
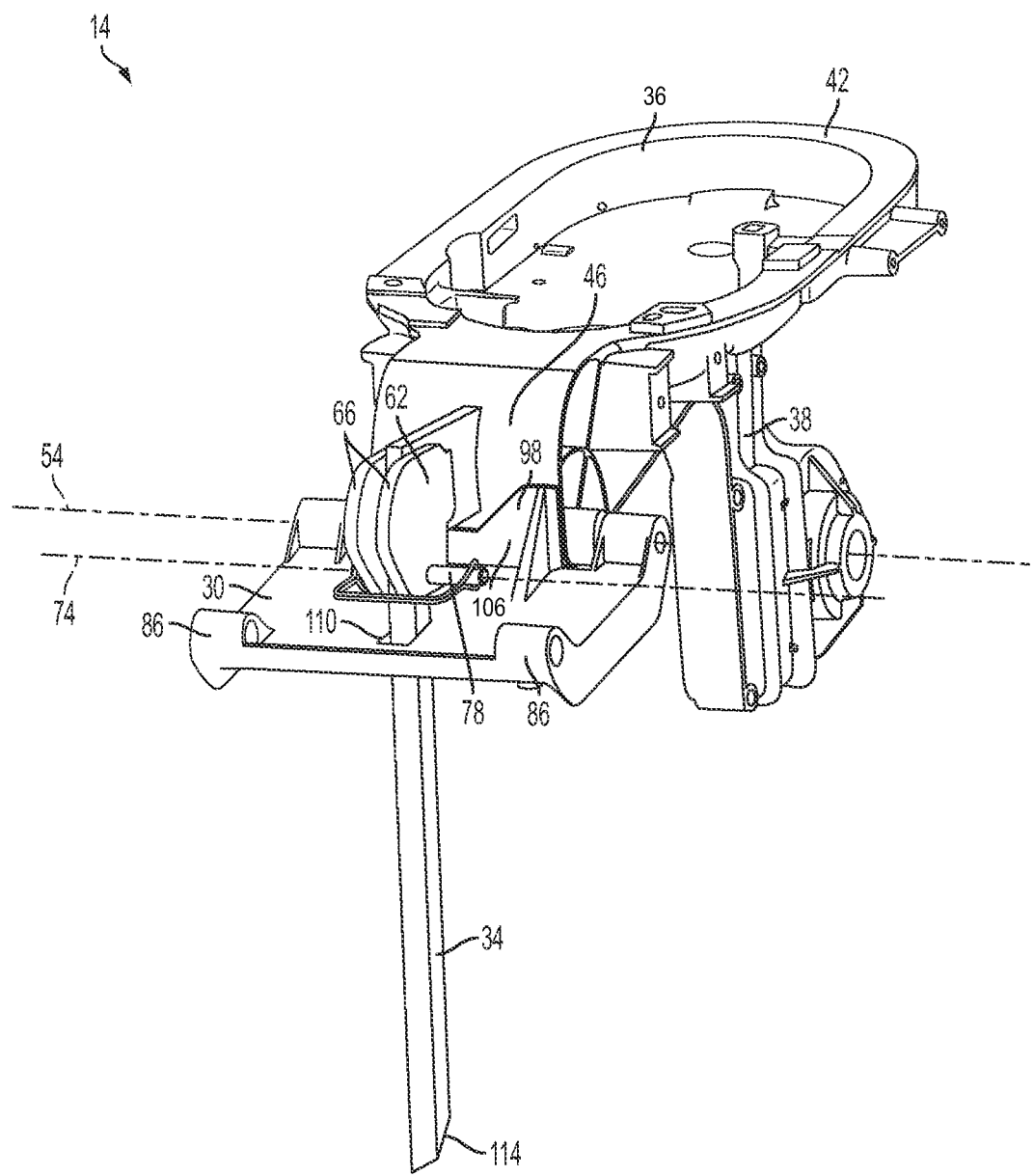
FIG. 5 is a rear perspective view of the frame of the tiller in the tilling configuration as shown in FIG. 1B.

Best illustrated in FIGS. 2 and 5, the swing arm 30 also includes a stop 98 configured to engage the body 36 when the swing arm 30 is in the first and second arm positions. More specifically, the first portion 102 of the stop 98 contacts the body 36 when the swing arm 30 is in the first arm position (see FIG. 2), and the second portion 106 of the stop 98 contacts the body 36 when the swing arm 30 is in the second arm position (see FIG. 4). As such, the stop 98 is configured to limit the overall travel of the swing arm 30. In the illustrated construction, the stop 98 also bears at least a portion of the weight of the tiller 10 during operation.

The swing arm 30 also defines a slot 110, and the drag stake 34 is arranged to extend therethrough. The slot 110 acts as a guide for the drag stake 34, pivoting the drag stake 34 about the second axis 74 in response to rotation of the swing arm 30 about the first axis 54. The drag stake 34 slides in the slide 110 during pivoting movement of the swing arm 30.

Illustrated in FIGS. 2-5, the drag stake 34 is substantially elongated and includes a tip 114 configured to engage the ground. The drag stake 34 defines a plurality of apertures 118 each spaced at varying distances from the tip 114. Each aperture 118 is alignable with the pin 78 at the second axis 74 to selectively set the depth of the drag stake 34. The drag stake 34 is coupled to the second mounting point 62 by the pin 78 engaging a selected one of the apertures 118. The drag stake 34 then pivots about the pin 78 in response to movement of the swing arm 30. In the illustrated construction, the drag stake 34 is pivotable over a stake angle $\alpha_2$, different than the arm angle $\alpha_1$, between a first stake position (corresponding to the travel configuration (see FIG. 2)), in which the drag stake 34 out of engagement with the ground, and a second stake position (corresponding to the tilling configuration (see FIG. 4)), in which the drag stake 34 engages the ground.

To transport the rotary tiller 10 between work sites, the tiller 10 is placed in the travel configuration. To do so, the user pivots the swing arm 30 about the first axis 54 until the first portion 102 of the stop 98 contacts the body 36, and the swing arm 30 is in the first arm position (see FIGS. 1A, 2 and 3). In this position, the wheels 32 are placed in supporting engagement with the ground (see FIG. 1A). As the swing arm 30 pivots, a side wall of the slot 110 contacts the drag stake 34, causing the drag stake 34 to also pivot (about the second axis 74) into the first stake position and out of engagement with the ground. The user may then roll the tiller 10 over ground without the tines 22 or the drag stake 34 contacting the ground (see FIG. 1A).

Figure 1B:
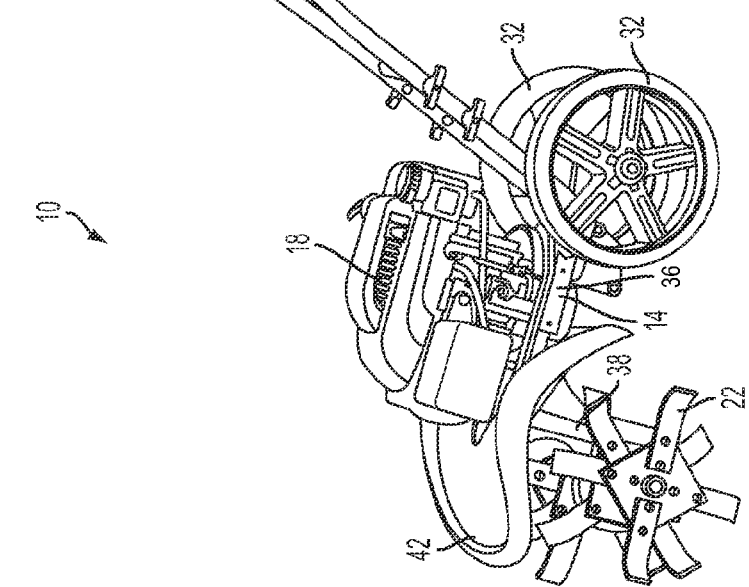
FIG. 1B is a side view of the rotary tiller shown in FIG. 1A in a tilling configuration.

To place the tiller 10 into the tilling configuration, the user pivots the swing arm 30 about the first axis 54 until the second portion 106 of the stop 98 contacts the body 36, and the swing arm 30 is in the second arm position (see FIGS. 1B, 4 and 5). As the swing arm 30 pivots about the first axis 54, an opposite side wall of the slot 110 engages the drag stake 34, causing the drag stake 34 to also pivot (about the second axis 74) into the second stake position to engage the ground. The wheels 32 are positioned such that the drag stake 34 and the tines 22 can engage the ground and work the soil (see FIG. 1B).

If the user wants to adjust the depth to which the drag stake 34 engages the soil, the user removes the pin 78 from the apertures 70 of the second mounting location 62 and from the selected aperture 118 in the drag stake 34. The user then re-positions the drag stake 34 to align the desired aperture 118 with the apertures 70 of the plates 66 along the second axis 74. The user then re-inserts the pin 78 to set the depth of the drag stake 34. The drag stake 34 will now pivot at the selected aperture 118 about the second axis 74.

One or more independent features and advantages of the invention may be set forth in the following claims.

What is claimed is:

1. A gas tiller having a travel configuration for transport over ground and a tilling configuration, the tiller comprising:
   a frame defining a first pivot axis and a second pivot axis substantially parallel to and spaced a distance from the first pivot axis;
   a motor coupled to the frame;
   a set of rotary tines coupled to the frame and operatively coupled to the motor;
   a swing arm pivotably coupled to the frame and supporting at least one wheel, the swing arm being pivotable about the first pivot axis between a first arm position, corresponding to the travel configuration and in which the wheel is in supporting engagement with the ground, and a second arm position, corresponding to the tilling configuration and in which the wheel is not in supporting engagement with the ground; and a drag stake coupled to the frame for pivoting movement about the second pivot axis between a first stake position, corresponding to the travel configuration and in which the drag stake is out of engagement with the ground, and a second stake position, corresponding to the tilling configuration and in which the drag stake is in engagement with the ground, movement of the swing arm between the first arm position and the second arm position causing movement of the drag stake between the first stake position and the second stake position.

2. The tiller of claim 1, wherein the swing arm defines a slot, and wherein the drag stake extends through the slot.

3. The tiller of claim 2, wherein the drag stake extends along a longitudinal axis, and wherein, during adjustment of the tiller between the travel configuration and the tilling configuration and with the drag stake coupled to the frame, the drag stake is slidable in the slot along the longitudinal axis.

4. The tiller of claim 2, wherein the swing arm has a first end pivotably coupled to the frame and an opposite second end, the wheel being rotatably connected to the second end, the slot being defined between the first end and the second end.

5. The tiller of claim 1, wherein the drag stake has a length and defines a plurality of apertures spaced along the length, each aperture being alignable with the second pivot axis to define an associated depth of the drag stake.

6. The tiller of claim 1, wherein the swing arm includes a stop, the stop contacting the frame when the swing arm is in at least one of the first arm position and the second arm position to limit movement of the swing arm.

7. The tiller of claim 6, wherein the swing arm includes a first stop contacting a first portion of the frame to limit movement of the swing arm beyond the first arm position and a second stop contacting a second portion of the frame to limit movement of the swing arm beyond the second arm position.

8. The tiller of claim 1, wherein the swing arm is pivotable with respect to the frame over a first angle between the first arm position and the second arm position, and wherein the drag stake is pivotable with respect to the frame over a second angle between the first stake position and the second stake position, the first angle and the second angle being different.

9. A gas tiller having a travel configuration for transport over ground and a tilling configuration, the tiller comprising:
a frame defining a first pivot axis and a second pivot axis substantially parallel to and spaced a distance from the first pivot axis;
a motor coupled to the frame;
a set of rotary tines coupled to the frame and operatively coupled to the motor;
a swing arm pivotably coupled to the frame and supporting at least one wheel, the swing arm being pivotable about the first pivot axis over a first angle between a first arm position, corresponding to the travel configuration and in which the wheel is in supporting engagement with the ground, and a second arm position, corresponding to the tilling configuration and in which the wheel is not in supporting engagement with the ground; and
a drag stake coupled to the frame for pivoting movement about the second pivot axis over a second angle between a first stake position, corresponding to the travel configuration and in which the drag stake is out of engagement with the ground, and a second stake position, corresponding to the tilling configuration and in which the drag stake is in engagement with the ground, the first angle and the second angle being different, movement of the swing arm between the first arm position and the second arm position causing movement of the drag stake between the first stake position and the second stake position.

10. A gas tiller having a travel configuration for transport over ground and a tilling configuration, the tiller comprising:
a frame defining a first pivot axis and a second pivot axis substantially parallel to and spaced a distance from the first pivot axis;
a motor coupled to the frame;
a set of rotary tines coupled to the frame and operatively coupled to the motor;
a swing arm pivotably coupled to the frame and supporting at least one wheel, the swing arm being pivotable about the first pivot axis over a first angle between a first arm position, corresponding to the travel configuration and in which the wheel is in supporting engagement with the ground, and a second arm position, corresponding to the tilling configuration and in which the wheel is not in supporting engagement with the ground; and
a drag stake coupled to the frame for pivoting movement about the second pivot axis over a second angle between a first stake position, corresponding to the travel configuration and in which the drag stake is out of engagement with the ground, and a second stake position, corresponding to the tilling configuration and in which the drag stake is in engagement with the ground, the first angle and the second angle being different, movement of the swing arm between the first arm position and the second arm position causing movement of the drag stake between the first stake position and the second stake position,
wherein the swing arm defines a slot, and wherein the drag stake extends through the slot.

11. The tiller of claim 10, wherein the drag stake extends along a longitudinal axis, and wherein, during adjustment of the tiller between the travel configuration and the tilling configuration and with the drag stake coupled to the frame, the drag stake is slidable in the slot along the longitudinal axis.

12. The tiller of claim 10, wherein the swing arm has a first end pivotably coupled to the frame and an opposite second end, the wheel being rotatably connected to the second end, the slot being defined between the first end and the second end.

13. The tiller of claim 9, wherein the drag stake has a length and defines a plurality of apertures spaced along the length, each aperture being alignable with the second pivot axis to define an associated depth of the drag stake.

14. The tiller of claim 9, wherein the swing arm includes a stop, the stop contacting the frame when the swing arm is in at least one of the first arm position and the second arm position to limit movement of the swing arm.

15. The tiller of claim 14, wherein the swing arm includes a first stop contacting a first portion of the frame to limit movement of the swing arm beyond the first arm position and a second stop contacting a second portion of the frame to limit movement of the swing arm beyond the second arm position.

16. A gas tiller having a travel configuration for transport over ground and a tilling configuration, the tiller comprising:
a frame defining a first pivot axis and a second pivot axis substantially parallel to and spaced a distance from the first pivot axis;
a motor coupled to the frame;
a set of rotary tines coupled to the frame and operatively coupled to the motor;
a swing arm defining a slot and supporting at least one wheel, the swing arm being coupled to the frame for pivoting movement about the first pivot axis between a first arm position, corresponding to the travel configuration and in which the wheel is in supporting engagement with the ground, and a second arm position, corresponding to the tilling configuration and in which the wheel is not in supporting engagement with the ground; and a drag stake coupled to the frame and extending through the slot, the drag stake being pivotable about the second pivot axis between a first stake position, corresponding to the travel configuration and in which the drag stake is out of engagement with the ground, and a second stake position, corresponding to the tilling configuration and in which the drag stake is in engagement with the ground, movement of the swing arm between the first arm position and the second arm position causing movement of the drag stake between the first stake position and the second stake position.

17. The tiller of claim 16, wherein the drag stake extends along a longitudinal axis, and wherein, during adjustment of the tiller between the travel configuration and the tilling configuration and with the drag stake coupled to the frame, the drag stake is slidable in the slot along the longitudinal axis.

18. The tiller of claim 16, wherein the swing arm has a first end pivotably coupled to the frame and an opposite second end, the wheel being rotatably connected to the second end, the slot being defined between the first end and the second end.

19. The tiller of claim 16, wherein the drag stake has a length and defines a plurality of apertures spaced along the length, each aperture being alignable with the second pivot axis to define an associated depth of the drag stake.

20. The tiller of claim 16, wherein the swing arm includes a stop, the stop contacting the frame when the swing arm is in at least one of the first arm position and the second arm position to limit movement of the swing arm.

21. The tiller of claim 20, wherein the swing arm includes a first stop contacting a first portion of the frame to limit movement of the swing arm beyond the first arm position and a second stop contacting a second portion of the frame to limit movement of the swing arm beyond the second arm position.

22. The tiller of claim 16, wherein the swing arm is pivotable with respect to the frame over a first angle between the first arm position and the second arm position, and wherein the drag stake is pivotable with respect to the frame over a second angle between the first stake position and the second stake position, the first angle and the second angle being different.

* * * * *